US012529248B2

(12) United States Patent
Nagasaki

(10) Patent No.: US 12,529,248 B2
(45) Date of Patent: Jan. 20, 2026

(54) VEHICLE DOOR CONTROL SYSTEM

(71) Applicant: TOYOTA JIDOSHA KABUSHIKI KAISHA, Toyota (JP)

(72) Inventor: Tetsuya Nagasaki, Okazaki (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 685 days.

(21) Appl. No.: 17/838,689

(22) Filed: Jun. 13, 2022

(65) Prior Publication Data

US 2022/0396980 A1 Dec. 15, 2022

(30) Foreign Application Priority Data

Jun. 15, 2021 (JP) ................................ 2021-099610

(51) Int. Cl.
*E05B 81/66* (2014.01)
*E05B 77/14* (2014.01)

(52) U.S. Cl.
CPC .............. *E05B 81/66* (2013.01); *E05B 77/14* (2013.01)

(58) Field of Classification Search
CPC ....................................................... E05B 81/70
See application file for complete search history.

(56) References Cited

U.S. PATENT DOCUMENTS 8,533,998 B2 * 9/2013 Nishikibe ............... E05B 81/68 49/280
10,119,308 B2 * 11/2018 Linden .................... E05B 81/76 292/216
2003/0052490 A1 * 3/2003 Willats .................... E05B 81/76 49/26
2003/0182863 A1 * 10/2003 Mejean ................... E05B 81/66
2006/0175899 A1 8/2006 Nagano et al.
2020/0032563 A1 * 1/2020 Kito ........................ E05B 81/14

FOREIGN PATENT DOCUMENTS

CN 1497120 A 5/2004
JP 2003020844 A 1/2003
JP 2007032139 A 2/2007
JP 2017-197912 A 11/2017
JP 2021011678 A * 2/2021
KR 19980053635 U * 10/1998 ............ E05B 81/54

OTHER PUBLICATIONS

Translation for KR 19980053635 U (Year: 2025).*

* cited by examiner

*Primary Examiner* — Alyson M Merlino
(74) *Attorney, Agent, or Firm* — Dinsmore & Shohl LLP

(57) ABSTRACT

A vehicle door control system includes a courtesy switch that detects an opened/closed state of a side door, a latch actuator that performs an unlatch operation for releasing a latch that holds the side door in a closed state, an unlatch switch that is provided in a vehicle compartment and is operated by a user when releasing the latch, and a controller that causes the latch actuator to perform the unlatch operation when the unlatch switch is operated. The controller prevents the unlatch operation from being executed in a period during which the side door is in an opened state, even when the unlatch switch is operated.

8 Claims, 8 Drawing Sheets

VEHICLE DOOR CONTROL SYSTEM

CROSS REFERENCE TO RELATED APPLICATION

This application claims priority to Japanese Patent Application No. 2021-099610 filed on Jun. 15, 2021, which is incorporated herein by reference in its entirety including the specification, claims, drawings, and abstract.

TECHNICAL FIELD

The present specification discloses a vehicle door control system for controlling the state of a latch of a vehicle door.

BACKGROUND

Usually, a vehicle is provided with a latch mechanism that securely holds a door in a closed state. For example, the latch mechanism has a latch body provided in the door, and a striker that is provided in the vehicle and is engageable with the latch body. When the door reaches a closure position, the latch body engages with the striker and the door is securely brought into the closed state.

As is known nowadays, there are electric latches configured to electrically release the latch. For example, Patent Document 1 discloses a technique according to which, when an unlatch switch provided in a vehicle is operated, an actuator drives a latch mechanism to release a latch of a door. According to Patent Document 1, when the closing of the door is detected, the driving of the actuator is prohibited for a predetermined time regardless of the operation of the unlatch switch. Adopting such a configuration can prevent unintentional release of the latch, even when the unlatch switch is accidentally touched immediately after the closure of the door.

CITATION LIST

PATENT DOCUMENT JP 2007-032139 A

Incidentally, although it depends on the position of the unlatch switch, a user may accidentally operate the unlatch switch while pulling an opened-state door in a closing direction; that is, before the door is completely closed. In this case, the driving of the latch actuator starts while the door is moving toward the closure position. Therefore, the latch may fail to be engaged even if the door reaches the closure position. The technique of Patent Document 1 is a technique effective after the engagement of the latch, although it intends to prohibit the latch release for a predetermined time. Accordingly, this conventional technique cannot solve a closure defect that the latch cannot be engaged even when the door reaches the closure position.

Therefore, the present specification discloses a vehicle door control system that can surely prevent the above-mentioned door closure defect.

SUMMARY

A vehicle door control system of the present specification includes a door sensor that detects an opened/closed state of a door, a latch actuator that performs an unlatch operation for releasing a latch that holds the door in a closed state, an unlatch switch that is provided in a vehicle compartment and is operated by a user when releasing the latch, and a controller that causes the latch actuator to execute the unlatch operation when the unlatch switch is operated, wherein the controller prevents execution of the unlatch operation in a period during which the door is in an opened state, even when the unlatch switch is operated.

Such a configuration makes it possible to perform latching appropriately, even when the user accidentally operates the unlatch switch when pulling the door in the closing direction from the inside of the vehicle. As a result, the door closure defect can be surely prevented.

In this case, the controller may cause the latch actuator to execute the unlatch operation when the unlatch switch is operated a specified reference number of times in a period during which the door is in the opened state, and the reference number of times may be two times or more.

Such a configuration enables the user to release the latch by operating the unlatch switch at least the reference number of times, even when the door is in the opened state, if the user wants to release the latch. In particular, it is necessary to release the latch in order to eliminate the incomplete closure of the door. The above-mentioned configuration enables the user to eliminate the incomplete closure of the door with a simple operation.

Further, the controller may cause the latch actuator to execute the unlatch operation when the unlatch switch is operated a specified reference number of times within a predetermined time limit, even in the opened state of the door, and the reference number of times may be two times or more.

Such a configuration enables the user to release the latch by operating the unlatch switch at least the reference number of times within the time limit, even when the door is in the opened state, if the user wants to release the latch; for example, if the user wants to release the latch for the purpose of releasing the incomplete closure of the door. Further, since the action of repeating the same operations within the time limit is an action that seldom occurs unless the user is clearly conscious of it, adopting such a configuration is effective to surely prevent the user from unintentionally releasing the latch.

Further, the controller may cause the latch actuator to execute the unlatch operation when the unlatch switch is pressed for a predetermined long time even in the opened state of the door.

Such a configuration enables the user to release the latch by pressing the unlatch switch for the predetermined long time, even when the door is in the opened state, if the user wants to release the latch; for example, if the user wants to release the latch for the purpose of releasing the incomplete closure of the door. Further, since the action of pressing the switch for the predetermined long time is an action that seldom occurs unless the user is clearly conscious of it, adopting such a configuration is effective to surely prevent the user from unintentionally releasing the latch.

Further, the door sensor may detect, as the opened state, an incompletely closed door state in which a latch body provided in the door is insufficiently engaged with a striker provided in the vehicle.

Since a door sensor can be obtained with a relatively simple configuration, the cost can be reduced.

Further, the door sensor may detect, in distinction from the opened state, the incompletely closed door state in which the latch body provided in the door is insufficiently engaged with the striker provided in the vehicle, and the controller may cause the latch actuator to execute the unlatch operation when the unlatch switch is operated in the period of the incompletely closed door state.

Such a configuration can surely prevent the user from unintentionally releasing the latch in the opened state. On the other hand, the incompletely closed door state can be easily eliminated.

Further, the unlatch switch may be installed on an inner end surface in a vehicle width direction of a door handle gripped by the user when opening or closing the door.

With such a configuration, the direction of a force applied to the door handle and the direction in which the unlatch switch is pressed down are opposite to each other, when closing the door from the inside of the vehicle. As a result, it is possible to more reliably prevent accidental operation of the unlatch switch during the closing of the door.

The technique disclosed in the present specification can more reliably prevent the above-mentioned door closure defect.

BRIEF DESCRIPTION OF DRAWINGS

Embodiment(s) of the present disclosure will be described based on the following figures, wherein.

DESCRIPTION OF EMBODIMENTS

Figure 1:
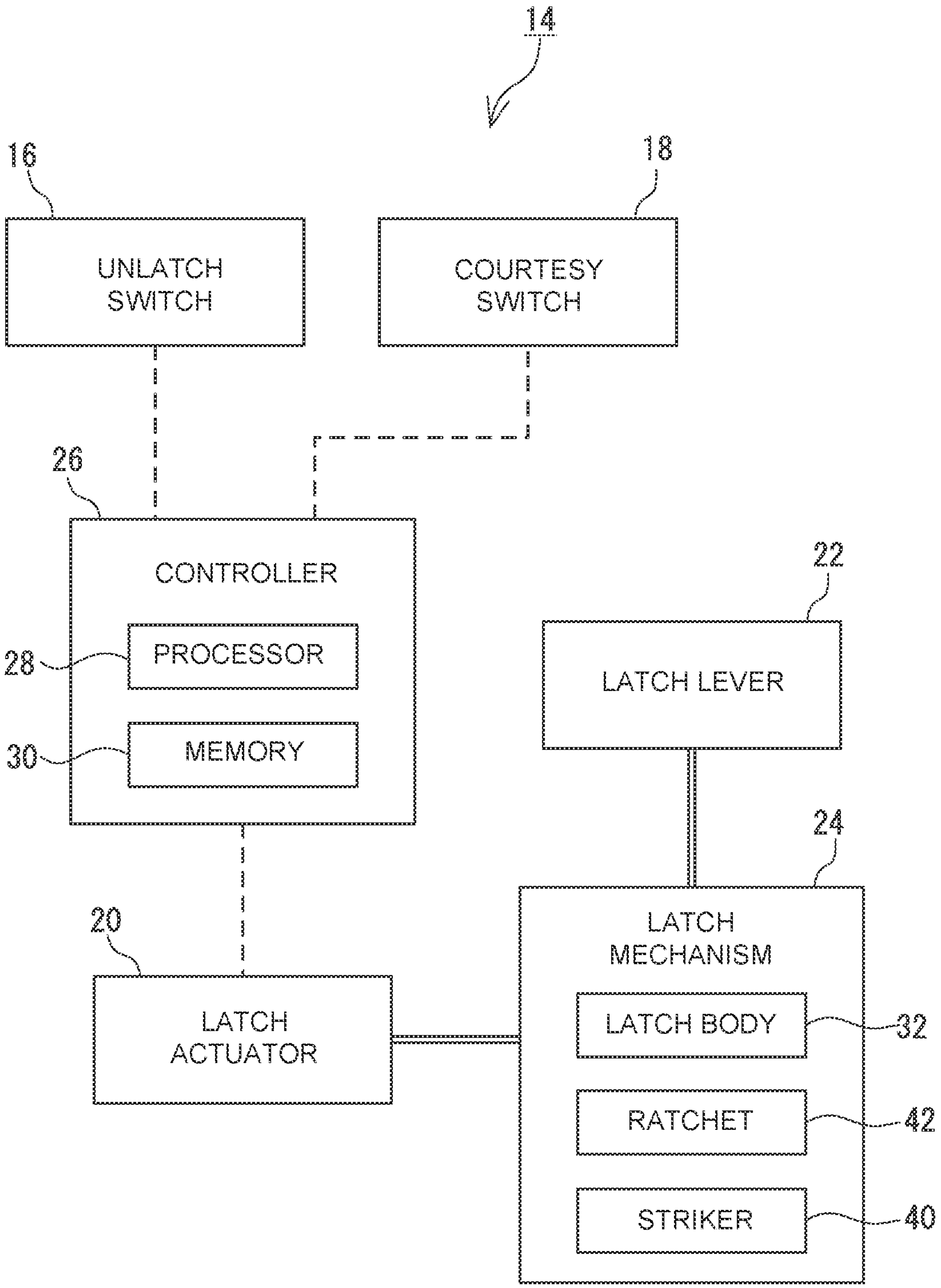
FIG. 1 is a block diagram illustrating an exemplary configuration of a vehicle door control system.
Figure 2:
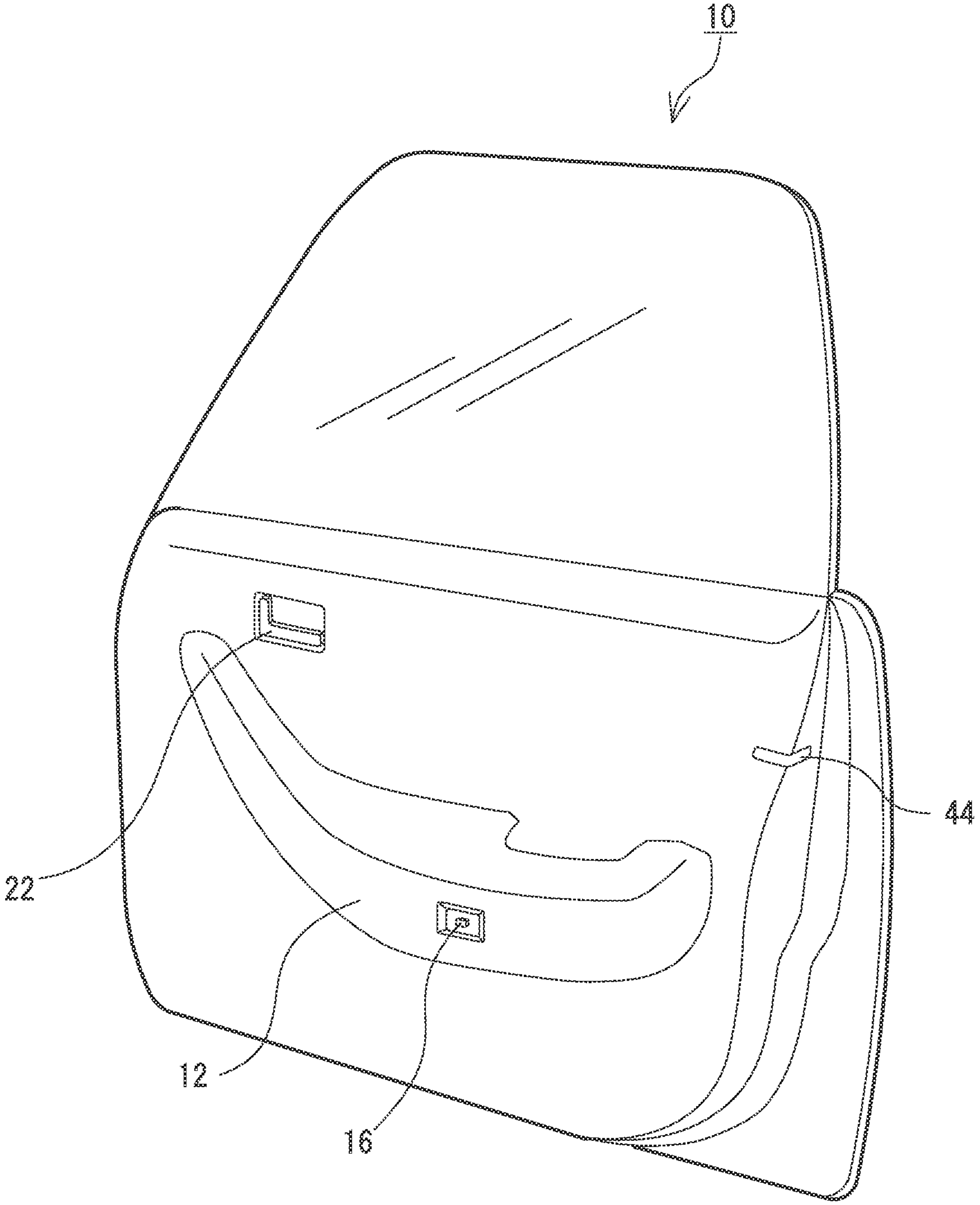
FIG. 2 is a perspective view illustrating a side door of a vehicle, which is seen from the vehicle compartment side.

Hereinafter, a vehicle door control system 14 will be described with reference to attached drawings. FIG. 1 is a block diagram illustrating an exemplary configuration of the vehicle door control system 14. FIG. 2 is a perspective view illustrating a side door 10 of a vehicle, which is seen from the vehicle compartment side.

In the present embodiment, a door to be controlled is the side door 10 illustrated in FIG. 2. The side door 10 is provided on the side of an automotive vehicle and covers a door opening on the side of the vehicle so as to be openable. The front end of the side door 10 is connected to a vehicle body via hinges (not illustrated), and the side door 10 is configured to be swingable about these hinges. In the following description, the state in which the side door 10 is completely closed is referred to as a "CL state", and the state in which the side door 10 is opened is referred to as an "OP state".

The vehicle is provided with a latch mechanism 24 that holds the CL state of the side door 10. As will be described in detail below, the latch mechanism 24 has a striker 40 fixed to the vehicle body, a latch body 32 that is engageable with the striker 40, and a ratchet 42 that interferes with the latch body 32 and restricts the swinging of the latch body 32 (see FIGS. 1 and 3, although they are not illustrated in FIG. 2). The latch body 32 and the ratchet 42 are provided inside the side door 10, and the side door 10 is held in the closed state when the latch body 32 is completely engaged with the striker 40. Exemplary states of the latch mechanism 24, which are representative latch states, include a "release state" in which the engagement between the latch body 32 and the striker 40 is completely released, a "full latch state" in which the latch body 32 is completely engaged with the striker 40, and a "half latch state" in which the latch body 32 is insufficiently engaged with the striker 40. Of these states, the half latch state is generally referred to as an "incompletely closed door" state, in which the closure of the side door 10 is not complete.

The control system 14 is a system that mainly manages these latch states. The control system 14 of the present embodiment includes, as illustrated in FIG. 1, comprises a latch lever 22, an unlatch switch 16, a courtesy switch 18, a latch actuator 20, and a controller 26, in addition to the latch mechanism 24.

Figure 3A:
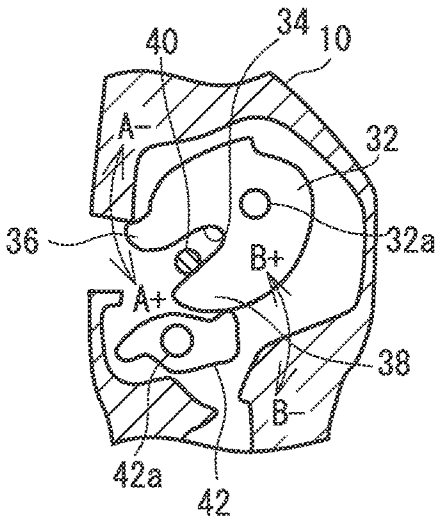
FIG. 3A is a diagram illustrating a latch mechanism in a release state.
Figure 3B:
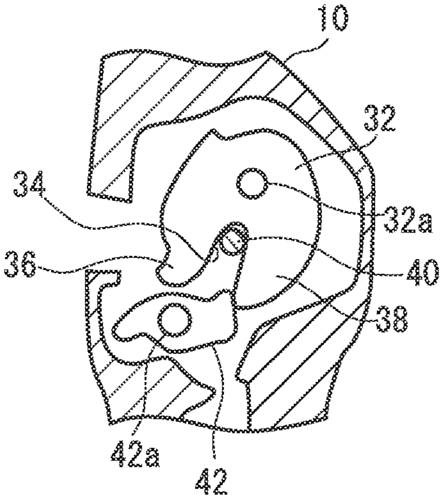
FIG. 3B is a diagram illustrating the latch mechanism in a half latch state.
Figure 3C:
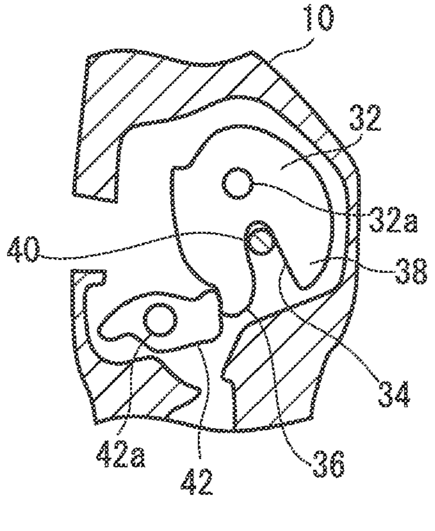
FIG. 3C is a diagram illustrating the latch mechanism in a full latch state.

First, an exemplary configuration of the latch mechanism 24 will be described with reference to FIGS. 3A to 3C. FIGS. 3A to 3C are diagrams illustrating an example of the latch mechanism 24. FIG. 3A illustrates the release state, FIG. 3B illustrates the half latch state, and FIG. 3C illustrates the full latch state. As described above, the latch mechanism 24 has the striker 40 fixed to the vehicle body, and the latch body 32 and the ratchet 42 installed inside the side door 10. The latch body 32 is a plate that is swingable abut a predetermined rotation axis 32*a*. In the transition from the release state to the full latch state, the latch body 32 swings in an engaging direction A+, which is the counterclockwise direction on the paper surface. In the transition from the full latch state to the release state, the latch body 32 swings in a releasing direction A−, which is the clockwise direction on the paper surface. The resilient force of a latch spring (not illustrated) is applied to the latch body 32 so that the latch body 32 is constantly urged in the releasing direction A−.

Further, the latch body 32 has an engagement groove 34, formed as a part thereof, for catching the striker 40 entering. In the release state, the engagement groove 34 opens diagonally downward so as to face the inside in the vehicle width direction. In the full latch state, the engagement groove 34 opens diagonally downward so as to face the outside in the vehicle width direction. The respective sides of the engagement groove 34 function as a full latch claw 36 and a half latch claw 38 that interfere with the ratchet 42. The full latch claw 36 is positioned on the releasing direction A− side with respect to the engagement groove 34, and the half latch claw 38 is positioned on the engaging direction A+ side with respect to the engagement groove 34.

The ratchet 42 is a plate that is swingable about a predetermined rotation axis 42*a*. The state of the ratchet 42 is changeable between a restrictive state in which the ratchet 42 interferes with a part of the latch body 32 and restricts the latch body 32 from swinging, and a permissive state in which the ratchet 42 is separated from the latch body 32 and enables the latch body 32 to swing. In the transition from the permissive state to the restrictive state, the ratchet 42 swings in a restrictive direction B+, which is the counterclockwise direction on the paper surface. In the transition from the restrictive state to the permissive state, the ratchet 42 swings in a permissive direction B−, which is the clockwise direction on the paper surface. The resilient force of a ratchet spring (not illustrated) is applied to the ratchet 42 so that the ratchet 42 is constantly urged in the restrictive direction B+.

The striker 40 is, for example, a substantially U-shaped bar, and is provided at an appropriate position of the vehicle body so that the striker 40 can enter the engagement groove 34 when the side door 10 is closed. As illustrated in FIG. 2, the side door 10 has an access groove 44 formed at a rear edge thereof to enable the striker 40 to enter.

When the side door 10 is moved in the closing direction from the OP state, the latch body 32 approaches the striker 40 and the striker 40 enters the engagement groove 34. While the closure movement advances, the striker 40 presses the latch body 32 in the engaging direction A+. As a result, the latch body 32 rotates in the engaging direction A+ against the resilient forces of the latch spring and the ratchet spring. The ratchet 42 gets over the half latch claw 38 with this rotation, and is brought into the half latch state illustrated in FIG. 3B. In the half latch state, the ratchet 42 interferes with the half latch claw 38. Therefore, the latch body 32 is restricted from swinging in the releasing direction A−. However, in this state, the side door 10 is not yet closed completely.

At the time the side door 10 is about to be completely closed, the latch body 32 further swings from the half latch state and causes the ratchet 42 to get over the full latch claw 36. This state is the full latch state illustrated in FIG. 3C. In the full latch state, since the ratchet 42 interferes with the full latch claw 36, the latch body 32 is restricted from swinging in the releasing direction A−. As a result, the side door 10 is held in the CL state.

After coming into the full latch state (that is, the CL state) or the half latch state, if the ratchet 42 is swung in the permissive direction B− against the resilient force of the ratchet spring, the resilient force of the latch spring will cause the latch body 32 to swing in the releasing direction A−. As a result, the engagement between the latch body 32 and the striker 40 is released, and the side door 10 can be opened. The above-described configuration is a mere example, and the latch mechanism 24 may be appropriately changed so long as the CL state of the side door 10 can be held.

Next, the exemplary configuration of the control system 14 will be described with reference to FIG. 1. The latch lever 22 is a lever mechanically connected to the ratchet 42 via a wire or the like. The latch lever 22 is installed, for example, on an inner surface of the side door 10, which faces the inside in the vehicle width direction, as illustrated in FIG. 2. When the latch lever 22 is pulled in a predetermined direction, the movement of the latch lever 22 is mechanically transmitted, as a movement in the permissive direction B−, to the ratchet 42. Accordingly, the ratchet 42 swings in the permissive direction B− and correspondingly the latch body 32 swings in the releasing direction A− so that the latch is released.

The unlatch switch 16 is a switch that is configured to be pressed down when operated by a user who intends to the release the latch. The unlatch switch 16 outputs a release signal, when operated. The unlatch switch 16 is, for example, provided on a door handle 12, as illustrated in FIG. 2. The door handle 12 is a handle that the user grips when opening or closing the side door 10 from the inside of the vehicle. In the present embodiment, the unlatch switch 16 is arranged on an inner surface of the door handle 12, which faces the inside in the vehicle width direction, so as to be positioned near a thumb of a hand griping the door handle 12. With such an arrangement, the user can perform both an operation for pressing down the unlatch switch 16 and an action for pressing the side door 10 in the opening direction in parallel. As a result, the side door 10 can be easily opened.

The latch actuator 20 is an actuator that executes, in response to a driving signal received from the controller 26, an unlatch operation for releasing the latch engaged by the latch mechanism 24. No particular limitation is imposed on the configuration of the latch actuator 20. For example, the latch actuator 20 may have a wire connected to the ratchet 42, a bobbin that takes up the wire, and a driving source that rotationally drives the bobbin. Examples of the driving source include a motor, a solenoid, and a hydraulic cylinder. When the latch actuator 20 is driven, the ratchet 42 swings in the permissive direction B− and the latch is released.

The courtesy switch 18 is a door sensor that detects the opened/closed state of the side door 10. The courtesy switch 18 is, for example, installed on the periphery of the door opening, and is a switch configured to be turned on when it is pressed by the side door 10 in the CL state and turned off when the pressing by the side door 10 is released. The detection result obtained by the courtesy switch 18; that is, the ON/OFF state of the courtesy switch 18, is input to the controller 26. In the incompletely closed door state (that is, in the half latch state), the courtesy switch 18 is turned on. Accordingly, the controller 26 determines that the incompletely closed door state is the OP state in which the side door 10 is opened.

The controller 26 controls the driving of the latch actuator 20, and is physically a computer having a processor 28 and a memory 30. Examples of this "computer" include a microcontroller in which a computer system is incorporated in a single integrated circuit. Further, the processor 28 may be replaced by a plurality of processors and the memory 30 may be replaced by a plurality of memories.

The controller 26 controls the driving of the latch actuator 20 according to respective signals received from the unlatch switch 16 and the courtesy switch 18. Specifically, when the courtesy switch 18 is in the OFF state (that is, when the side door 10 is in the CL state) and the release signal is input from the unlatch switch 16 (that is, when the unlatch switch 16 is operated), the controller 26 drives the latch actuator 20 to release the latch. On the other hand, when the courtesy switch 18 is in the ON state (that is, when the side door 10 is in the OP state), the controller 26 does not drive the latch actuator 20 and accordingly does not release the latch even when the release signal is input from the unlatch switch 16 (that is, even when the unlatch switch 16 is operated). In other words, in the present embodiment, when the side door 10 is in the OP state, the unlatch switch 16 is disabled.

Figure 4:
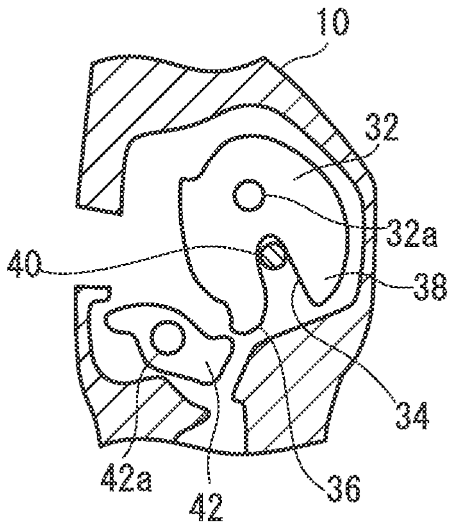
FIG. 4 is a diagram illustrating the latch mechanism when an unlatch operation is executed.

The reason why the unlatch switch 16 is disabled in the OP state is to prevent the closure defect of the side door 10. That is, as described above, in the present embodiment, the unlatch switch 16 is provided at the position that is easily accessible by a hand that grips the door handle 12. Therefore, there is a possibility that the unlatch switch 16 may be accidentally pressed down when the door handle 12 is pulled inward in the vehicle width direction to close the side door 10 being in the OP state. Here, enabling the unlatch switch 16 even in the OP state may lead to an unwanted driving of the latch actuator 20 if the unlatch switch 16 is accidentally pressed down during the closing of the side door 10. In this case, even when the side door 10 has reached the closure position, the latch will not be engaged. That is, when the latch actuator 20 is driven, the ratchet 42 is pulled in the permissive direction B−, as illustrated in FIG. 4. Therefore, as soon as the force for pushing the side door 10 in the closing direction disappears, the latch body 32 moves in the releasing direction A− due to the resilient force of the latch spring. As a result, engagement of the latch fails, and the side door 10 cannot be held in the CL state. On the other hand, there is a possibility that the user may think that the side door 10 has been appropriately closed, from the fact that the side door 10 has reached the closure position, and may not be aware of the released state of the latch.

In order to avoid such problems, in the present embodiment, the unlatch switch 16 is disabled in the OP state. Such a configuration can prevent the latch actuator 20 from driving even when the unlatch switch 16 is accidentally operated during the closing of the side door 10. As a result, it is possible to effectively prevent the closure defect that the latch cannot be engaged when the side door 10 reaches the closure position.

However, in the present embodiment, if the unlatch switch 16 is operated twice even in the OP state, the latch actuator 20 is driven and the latch is released. This intends to eliminate the half latch state (that is, incompletely closed door state). That is, as described above and as illustrated in FIG. 3B, the latch body 32 is incompletely engaged with the striker 40 in the half latch state. In order to eliminate this half latch state, it is necessary to release the latch once, open the side door 10 wide, and then pull the side door 10 in the closing direction again while gaining momentum. That is, in order to eliminate the half latch state, the unlatch operation for swinging the ratchet 42 in the permissive direction B− is required. On the other hand, in the present embodiment, the half latch state is detected as the OP state. Therefore, if the unlatch switch 16 is completely disabled in the OP state, it is necessary to separately operate the latch lever 22 in order to eliminate the half latch state, which makes the operation complicated.

Therefore, in the present embodiment, if the unlatch switch 16 is operated a predetermined reference number of times, the latch actuator 20 is driven and the latch mechanism 24 is released, even in the OP state. Accordingly, in response to the transition from the CL state to the OP state, the controller 26 counts the number of times i of the operation of the unlatch switch 16; that is, the number of times of the reception of the release signal. Then, the controller 26 drives the latch actuator 20 and releases the latch mechanism 24 at the time when the number of times i of the operation reaches the reference number of times. With such a configuration, even in the half latch state, the latch can be released by operating the unlatch switch 16 the reference number of times, and accordingly the half latch state can be released. The reference number of times is not particularly limited as long as it is a numerical value equal to or larger than 2, but the reference number of times will be described as “2” in the following description. Here, usually, if a person cannot obtain a predetermined reaction when operating the switch once, the person will suspect the occurrence of an incidental mistake (for example, insufficient switch depression amount, noise, or poor contact) and in many cases will perform the switch operation again. Even in the present embodiment, it is natural for the user to operate the unlatch switch 16 again if the latch cannot be released even when the unlatch switch 16 is operated once in the event of occurrence of the half latch state. Accordingly, as mentioned above, by adopting the configuration for exceptionally executing the unlatch operation when the unlatch switch 16 is operated twice even in the OP state, the user can easily eliminate the half latch state without being aware of a special operating procedure.

Figure 5:
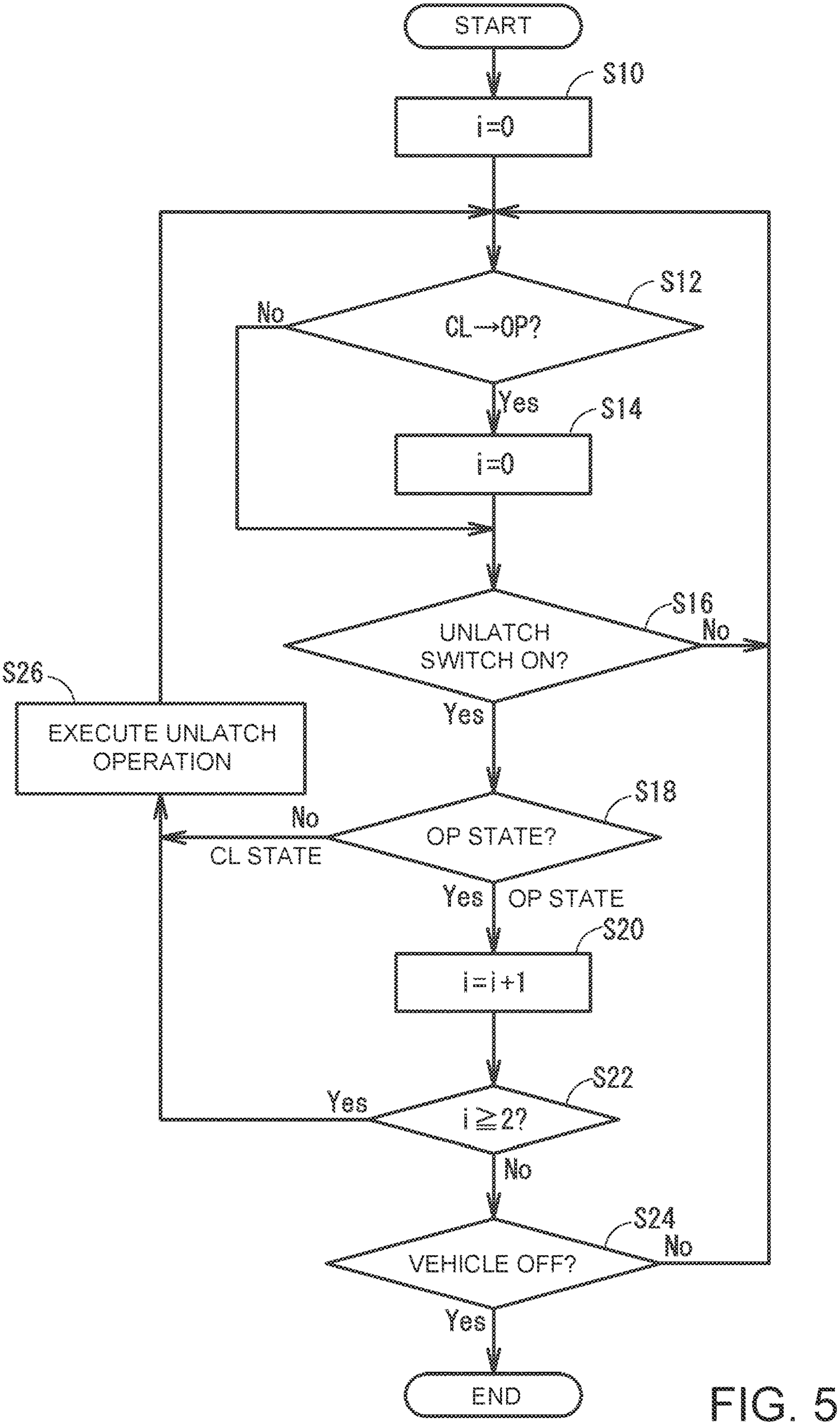
FIG. 5 is a flowchart illustrating an exemplary flow of controller processing.

Next, an exemplary processing flow of the controller 26 will be described with reference to FIG. 5. When the vehicle is activated, the controller 26 initializes the number of times i of the operation; namely sets i=0 (step S10). Subsequently, the controller 26 periodically monitors the state of the courtesy switch 18 and, in response to the transition from the CL state to the OP state; that is, in response to the transition from the OFF state to the ON state of the courtesy switch 18, initializes the number of times i of the operation again; namely sets i=0 (steps S12 and S14).

Further, the controller 26 monitors the operation state of the unlatch switch 16 (step S16). As a result of the monitoring, if the unlatch switch 16 remains OFF, the controller 26 continues to stand by. On the other hand, if the unlatch switch 16 is turned on (Yes in step S16), the controller 26 confirms the current opened/closed state of the side door 10 (step S18). Then, in the case of the CL state (No in step S18), the controller 26 instructs the latch actuator 20 to execute the unlatch operation (step S26). On the other hand, in the case of the OP state (Yes in step S18), the controller 26 increments the number of times i of the operation by one (step S20). Subsequently, the controller 26 confirms the current number of times i of the operation (step S22). Further, the controller 26 determines whether the vehicle is OFF (step S24). If the current number of times i of the operation is equal to or larger than 2 (Yes in step S22), the controller 26 instructs the latch actuator 20 to execute the unlatch operation (step S26). On the other hand, if the number of times i of the operation is less than 2 (No in step S22) and the vehicle is not OFF (No in step S24), the processing returns to step S12 and the controller 26 repeats similar processing.

Figure 6:
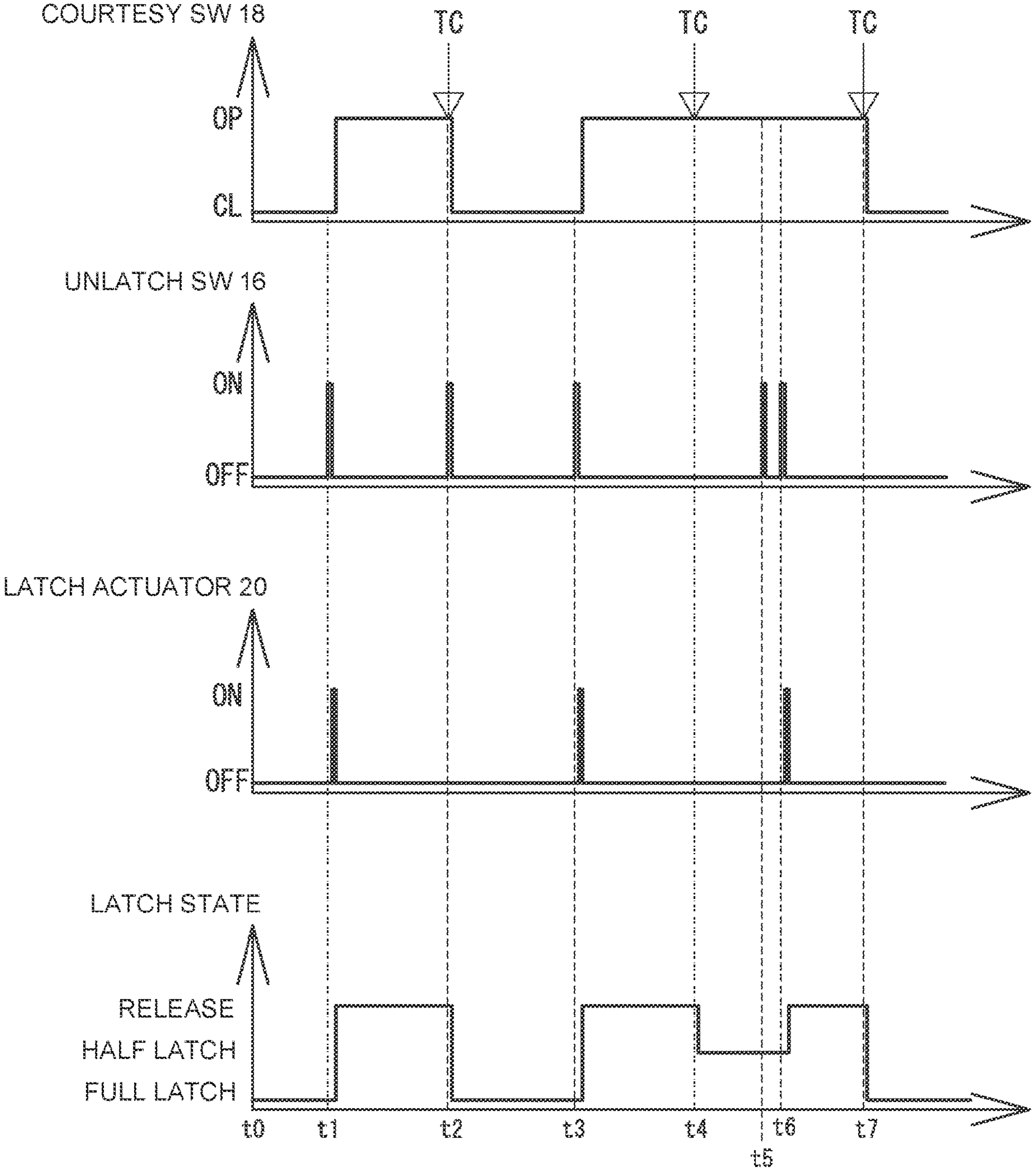
FIG. 6 is a timing chart illustrating an exemplary operation of the control system.

Next, an exemplary operation of the control system 14 will be described with reference to FIG. 6. FIG. 6 is a timing chart illustrating the exemplary operation of the control system 14. The first drawing in the example of FIG. 6 illustrates the state of the courtesy switch 18, the second drawing illustrates the state of the unlatch switch 16, the third drawing illustrates the state of the latch actuator 20, and the fourth drawing illustrates the state of the latch mechanism 24. Further, in FIG. 6, an arrow TC indicates the execution timing of the door closing action, at which the user starts pulling the side door 10 inward in the vehicle width direction.

In the example of FIG. 6, the side door 10 is in the CL state at time t0. Subsequently, at time t1, the unlatch switch 16 is operated. In this case, the controller 26 immediately drives the latch actuator 20 to release the latch. As a result, immediately after time t1, the latch mechanism 24 transitions to the release state, and the side door 10 is brought into the OP state.

Next, at time t2, the user performs the door closing action. At this time, let it be assumed that the unlatch switch 16 is accidentally pressed down. Since the pressing down of the unlatch switch 16 has been performed in the OP state, the controller 26 does not drive the latch actuator 20. As a result, immediately after time t2, the latch mechanism 24 transitions to the full latch state, in which the courtesy switch 18 is in the CL state. That is, even if the unlatch switch 16 is operated in parallel with the closing action for pulling the side door 10 inward, the side door 10 can be appropriately closed.

Next, at time t3, let it be assumed the unlatch switch 16 is operated again. At this time, since the courtesy switch 18 is in the CL state, the controller 26 immediately drives the latch actuator 20 to release the latch.

Next, let it be assumed that the user performs the closing action at time t4. However, in the closing action at time t4, the force for pulling the side door 10 in the closing direction is so insufficient that the door remains in the half latch state; namely in the incompletely closed door state. In this case, the half latch state cannot be eliminated unless the latch mechanism 24 is once returned to the release state. Therefore, at time t5, the user operates the unlatch switch 16 to open the side door 10. However, since the courtesy switch 18 is in the OP state at this time, the controller 26 does not drive the latch actuator 20. In this case, the user thinks that an incidental mistake has occurred and, at time t6, performs the operation of the unlatch switch 16 again. As a result, the number of times i of the operation is incremented to "2" during the period of OP state, and therefore the controller 26 causes the latch actuator 20 to execute the latch operation. As a result, the latch mechanism 24 transitions to the release state, and the user can swing the side door 10 in the opening direction. If the side door 10 can be opened wide at time t7, the user again performs the closing action for pulling the side door 10 in the closing direction. As a result, the latch mechanism 24 transitions to the full latch state, and the side door 10 is appropriately closed.

As is apparent from the foregoing description, according to the present embodiment, even if the unlatch switch 16 is accidentally operated during the closing of the side door 10, since this operation is invalidated, the side door 10 can be closed appropriately. On the other hand, in the OP state, if the unlatch switch 16 is operated two times, the unlatch operation is executed, and therefore the incompletely closed door state can be eliminated appropriately and simply.

The configuration described above is a mere example, and the configuration may be appropriately modified so long as it can basically prevent the execution of the unlatch operation even if the unlatch switch 16 is operated during the period of OP state.

For example, the conditions for exceptionally executing the unlatch operation during the period of OP state may be appropriately changed. That is, in the above-described example, if the total number of operations of the unlatch switch 16 reaches 2 during the period of OP state, the unlatch operation is exceptionally executed. However, the total number of operations for exceptionally executing the unlatch operation is not limited to 2 and may be larger than 2.

Figure 7:
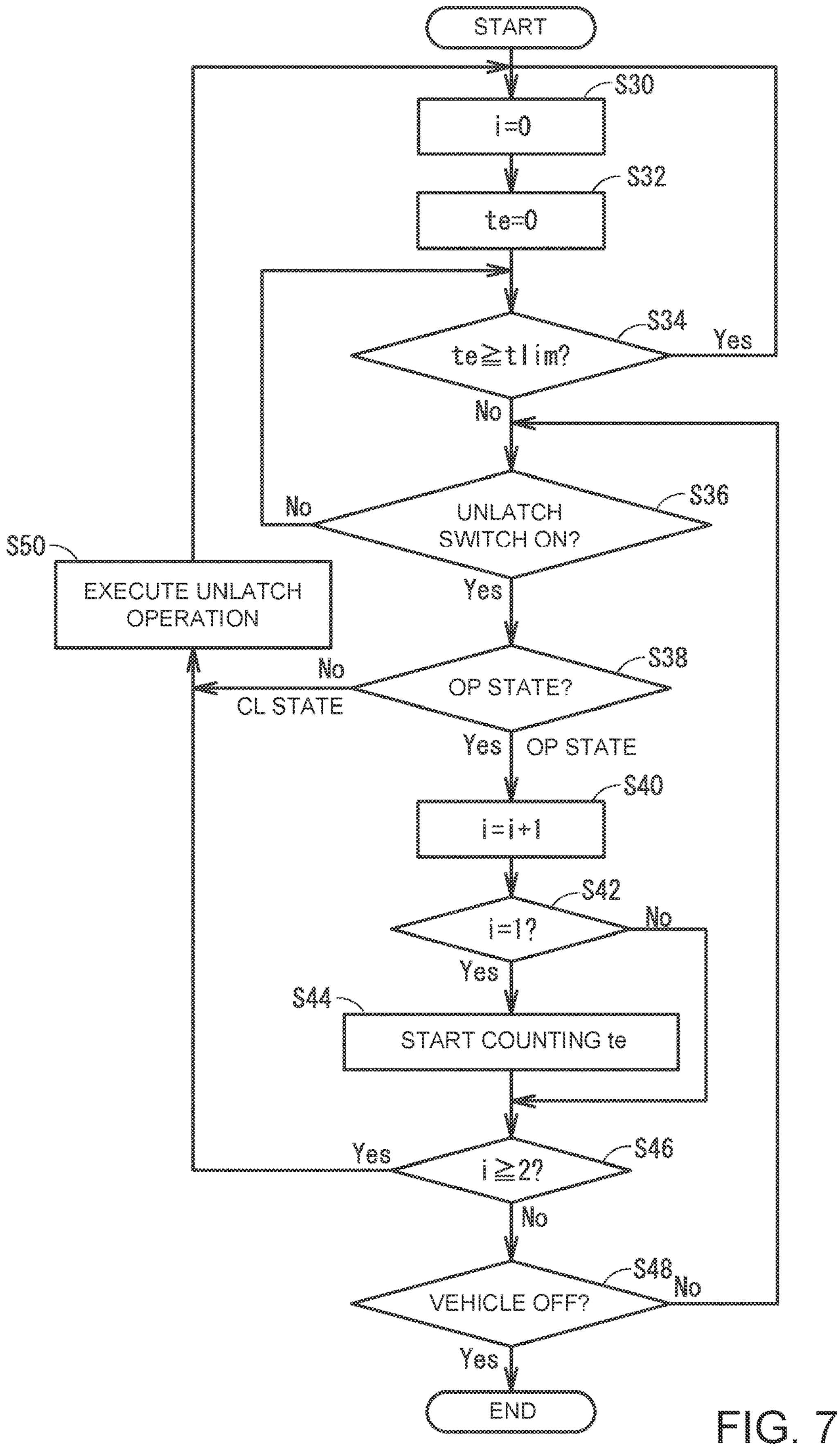
FIG. 7 is a flowchart illustrating other exemplary flow of controller processing.

Further, the unlatch operation may be exceptionally executed when the unlatch switch 16 is repeatedly pressed down within a predetermined time regardless of the total number of operations. FIG. 7 is a flowchart illustrating processing to be performed in this case. As illustrated in FIG. 7, in this case, the controller 26 manages elapsed time te as another parameter, in addition to the number of times i of the operation. Immediately after the activation of the vehicle, the controller 26 initializes these two parameters i and te, respectively; namely sets i=0 and te=0 (steps S30 and S32). Subsequently, if the elapsed time te is equal to or greater than a predetermined time limit tlim (Yes in step S34), the parameters i and te are initialized. Further, the controller 26 monitors the operation state of the unlatch switch 16 (step S36). As a result of the monitoring, if the unlatch switch 16 is operated (Yes in step S36), the controller 26 confirms the opened/closed state of the side door 10 (step S38). Then, in the case of the CL state (No in step S38), the controller 26 causes the latch actuator 20 to execute the unlatch operation immediately (step S50). On the other hand, in the case of the OP state (Yes in step S38), the controller 26 increments the number of times i of the operation by one (step S40). Then, if the incremented number of times i of the operation is "1" (Yes in step S42), the controller 26 starts counting the elapsed time te (step S44). Further, if the incremented number of times i of the operation is "2" (Yes in step S46), the controller 26 causes the latch actuator 20 to execute the unlatch operation (step S50). Further, the control 26 determines whether the vehicle is OFF (step S48). If the number of times i of the operation is less than 2, the processing returns to step S36, and the controller 26 repeats similar processing.

As mentioned above, in the case of FIG. 7, the number of times i of the operation is initialized when the time limit tlim has elapsed. In other words, in the case of FIG. 7, in the OP state, the latch is not released unless the pressing down operation is performed twice within the time limit tlim. In general, continuously performing the pressing down operation twice within the time limit tlim is unlikely to occur incidentally and the user is required to act with clear consciousness. Accordingly, such a configuration can more reliably prevent the unlatch operation from being executed against the intention of user in the OP state. The value of the time limit tlim is not limited particularly, but an appropriate value equal to or less than three seconds can be set as the time limit tlim, usually.

Figure 8:
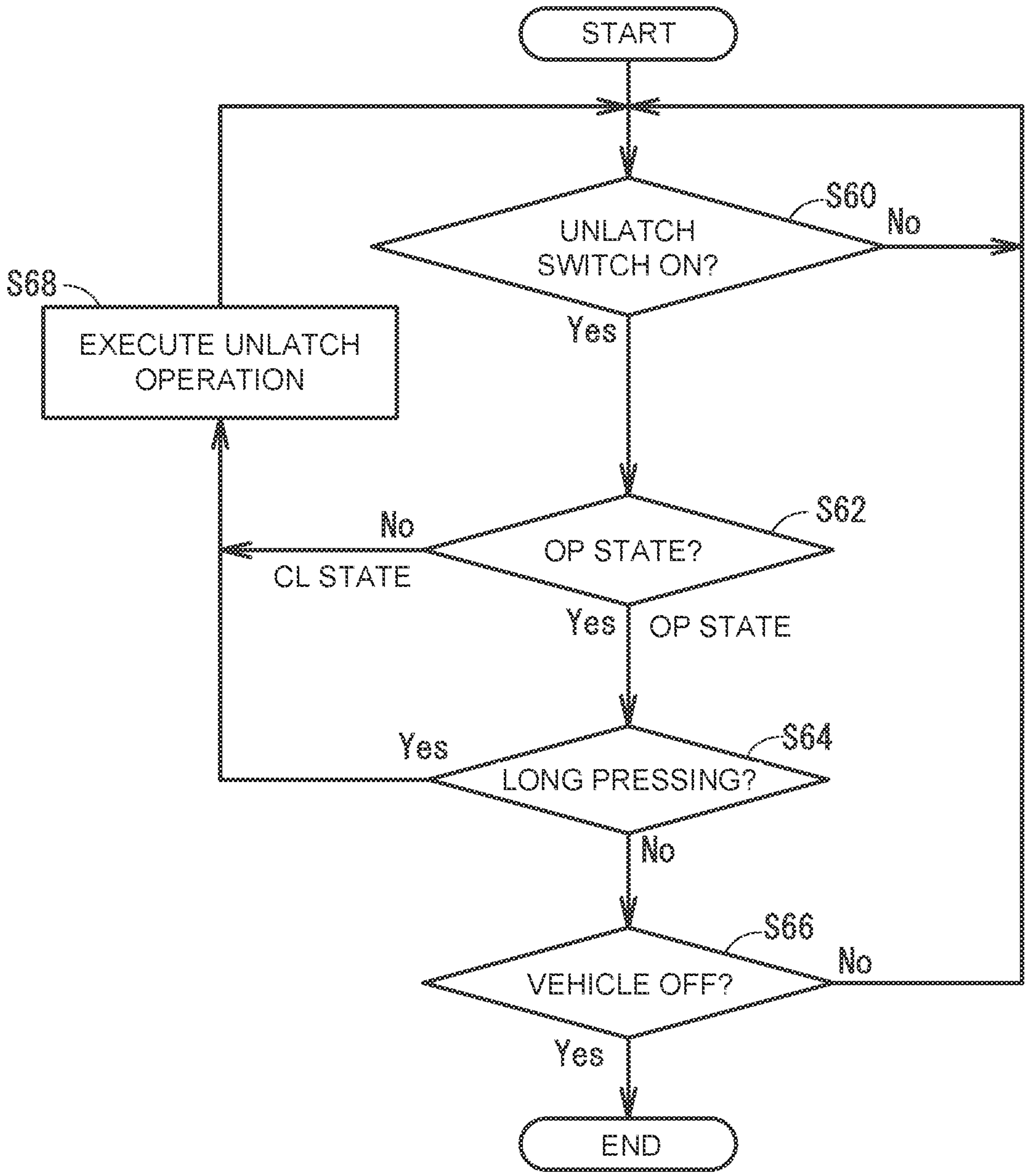
FIG. 8 is a flowchart illustrating other exemplary flow of controller processing.

Further, as another embodiment, in the case of the OP state, the unlatch operation may be executed only when the unlatch switch 16 is pressed for a long time. That is, as illustrated in FIG. 8, when the unlatch switch 16 is turned on in the OP state (Yes in step S60 and Yes in step S62), the controller 26 may confirm whether the operation content is long pressing (step S64). Then, only when the result of confirmation indicates the long pressing (Yes in step S64), the controller 26 may cause the latch actuator 20 to execute the unlatch operation (step S68). Further, the controller 26 determines whether the vehicle is OFF (step S66). If it is not the long pressing, the controller 26 may be configured to prohibit the unlatch operation regardless of the number of times i of the operation. Here, the long pressing action is unlikely occur incidentally unless the user acts with clear consciousness. Accordingly, such a configuration can surely prevent the unlatch operation from being executed against the intention of user in the OP state.

Further, as described above, the courtesy switch 18 is used as the door sensor. Therefore, the incompletely closed door state in which the latch mechanism 24 is in the half latch state is also detected as the OP state. However, the above-described door sensor may be replaced by a sensor capable of distinguishing the half latch state and the release state. For example, the door sensor may be configured to have a latch state switch that detects the latch state, in addition to the courtesy switch 18. No particular limitation is imposed on the configuration of this latch state switch. For example, a rotary switch that outputs a signal varying depending on the swing amount of the latch body 32 may be used as the latch state switch. In this case, the rotary switch has an operation knob mechanically connected to the latch body 32 and swings together with the latch body 32. The controller 26 can detect the half latch state based on both a detection result of the latch state switch and a detection result of the courtesy switch 18. In this case, the controller 26 may completely disable the unlatch switch 16 in the release state and may enable the unlatch switch 16 in the half latch state. Such a configuration can more reliably prevent the unlatch operation from being executed against the intention of the user in the OP state and easily eliminate the incomplete closure of the door.

Further, as described above, the unlatch switch 16 is exceptionally enabled even in the OP state when the predetermined condition is satisfied. However, in the case of the OP state, the unlatch switch 16 may be constantly disabled. In this case, the incompletely closed door state can be eliminated by operating the latch lever 22.

Further, as described above, the unlatch switch 16 is disabled in the case of the OP state, but the unlatch switch 16 may also be disabled in other situations. For example, immediately after the side door 10 is closed; that is, immediately after the transition from the release state to the full latch state in the latch mechanism 24, the user is still holding the door handle 12. Therefore, immediately after this closing, the user's finger may accidentally touch the unlatch switch 16 and the unlatch switch 16 may be turned on. In this case, since the latch is released immediately after the closure of the side door 10, the user has to perform the closing action again, which is troublesome. Therefore, in the case of transition from the release state to the full latch state, the unlatch switch 16 may be disabled until a predetermined standby time elapses. Such a configuration can effectively prevent the side door 10 from being opened against the intention of user. In this case, the standby time is not particularly limited and can be set to a value equal to or less than 1 second, for example. Further, the unlatch switch 16 may be disabled even when the vehicle starts traveling.

Further, as described above, the unlatch switch 16 is one that can be physically pressed down. However, the unlatch switch 16 can be any other switch so long as it can detect a pressing-down or touch operation. For example, the unlatch switch 16 may be a touch switch that can detect a finger's touch.

REFERENCE SIGNS LIST

10 Side door
12 Door handle
14 Control system
16 Unlatch switch
18 Courtesy switch
20 Latch actuator
22 Latch lever
24 Latch mechanism
26 Controller
28 Processor
30 Memory
32 Latch body
**32*a*** Rotation axis
34 Engagement groove
36 Full latch claw
38 Half latch claw
40 Striker
42 Ratchet
**42*a*** Rotation axis
44 Access groove

The invention claimed is:

1. A vehicle door control system comprising:

a door sensor that detects both an opened state and a closed state of a door;

a latch actuator that performs an unlatch operation for releasing a latch mechanism that holds the door in the closed state;

an unlatch switch that is provided in a vehicle compartment and is operated by a user to initiate the unlatch operation for releasing the latch mechanism; and a controller that causes the latch actuator to execute the unlatch operation when the unlatch switch is operated in a period during which the door sensor detects the closed state of the door, wherein the controller prevents the unlatch operation from being executed by the latch actuator in a period during which the door sensor detects the opened state of the door, even when the unlatch switch is operated once, wherein the door sensor detects, in distinction from the opened state, an incompletely closed door state in which a latch body of the latch mechanism, provided in the door, is insufficiently engaged with a striker provided in a vehicle, and wherein the controller causes the latch actuator to execute the unlatch operation when the unlatch switch is operated in a period during which the door sensor detects the incompletely closed door state of the door.

2. The vehicle door control system according to claim 1, wherein the controller causes the latch actuator to execute the unlatch operation when the unlatch switch is operated two or more times in the period during which the door sensor detects the opened state of the door.

3. The vehicle door control system according to claim 1, wherein the controller causes the latch actuator to execute the unlatch operation when the unlatch switch is operated two or more times within a predetermined time limit, even in the opened state of the door.

4. The vehicle door control system according to claim 1, wherein the controller causes the latch actuator to execute the unlatch operation when the unlatch switch is pressed for a predetermined long time even in the opened state of the door.

5. The vehicle door control system according to claim 1, wherein the unlatch switch is installed on an inner end surface in a vehicle width direction of a door handle gripped by the user when opening or closing the door.

6. A vehicle door control system comprising:

a door sensor that detects both an opened state and a closed state of a door;

a latch actuator that performs an unlatch operation for releasing a latch mechanism that holds the door in the closed state;

an unlatch switch that is provided in a vehicle compartment and is operated by a user to initiate the unlatch operation for releasing the latch mechanism; and a controller that causes the latch actuator to execute the unlatch operation when the unlatch switch is operated in a period during which the door sensor detects the closed state of the door, wherein the controller prevents the unlatch operation from being executed by the latch actuator in a period during which the door sensor detects the opened state of the door, even when the unlatch switch is operated once, and wherein the controller causes the latch actuator to execute the unlatch operation when the unlatch switch is operated two or more times in the period during which the door sensor detects the opened state of the door.

7. The vehicle door control system according to claim 6, wherein the door sensor detects, as the opened state, an incompletely closed door state of the door in which a latch body of the latch mechanism, provided in the door, is insufficiently engaged with a striker provided in a vehicle.

8. The vehicle door control system according to claim 6, wherein the unlatch switch is installed on an inner end surface in a vehicle width direction of a door handle gripped by the user when opening or closing the door.

* * * * *